Oct. 25, 1966  P. B. RENFREW  3,280,981
FILTER ASSEMBLY
Filed Feb. 10, 1964
2 Sheets-Sheet 2
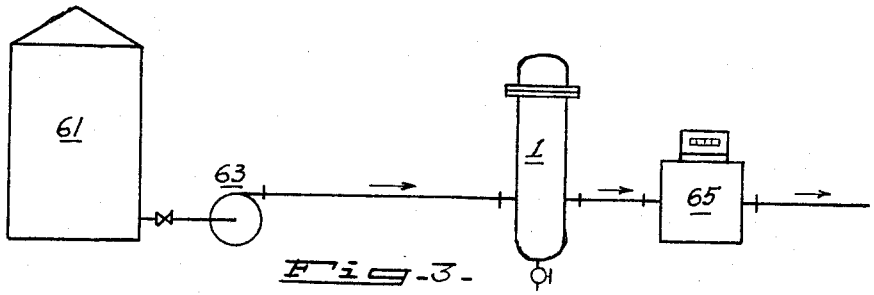
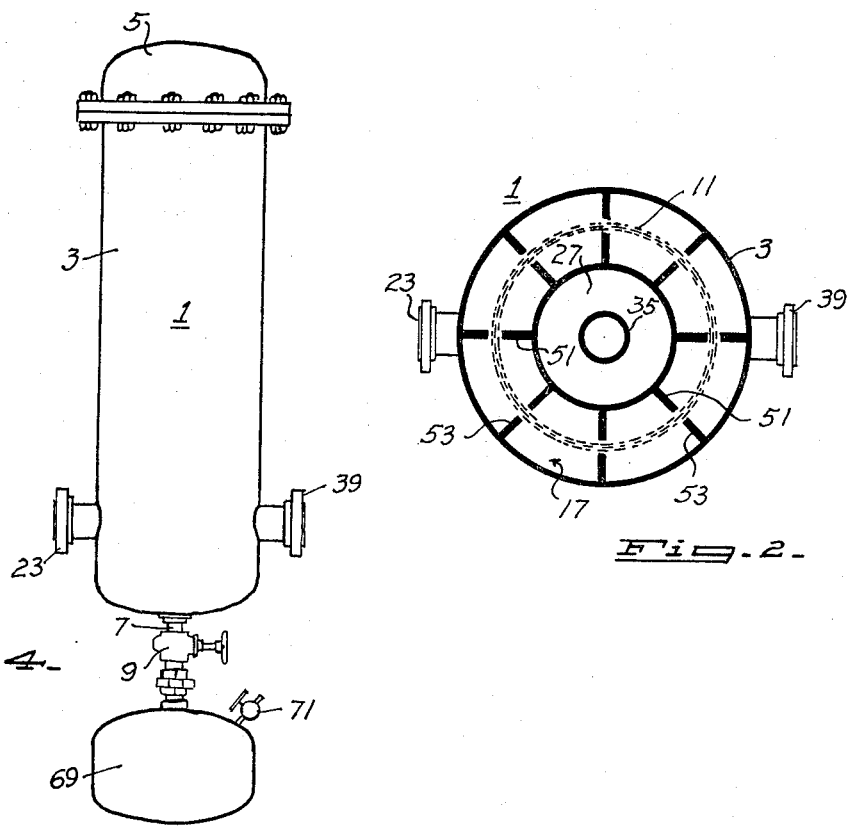
INVENTOR.
PAUL B. RENFREW
BY Bruce & Brooker
His Attorneys

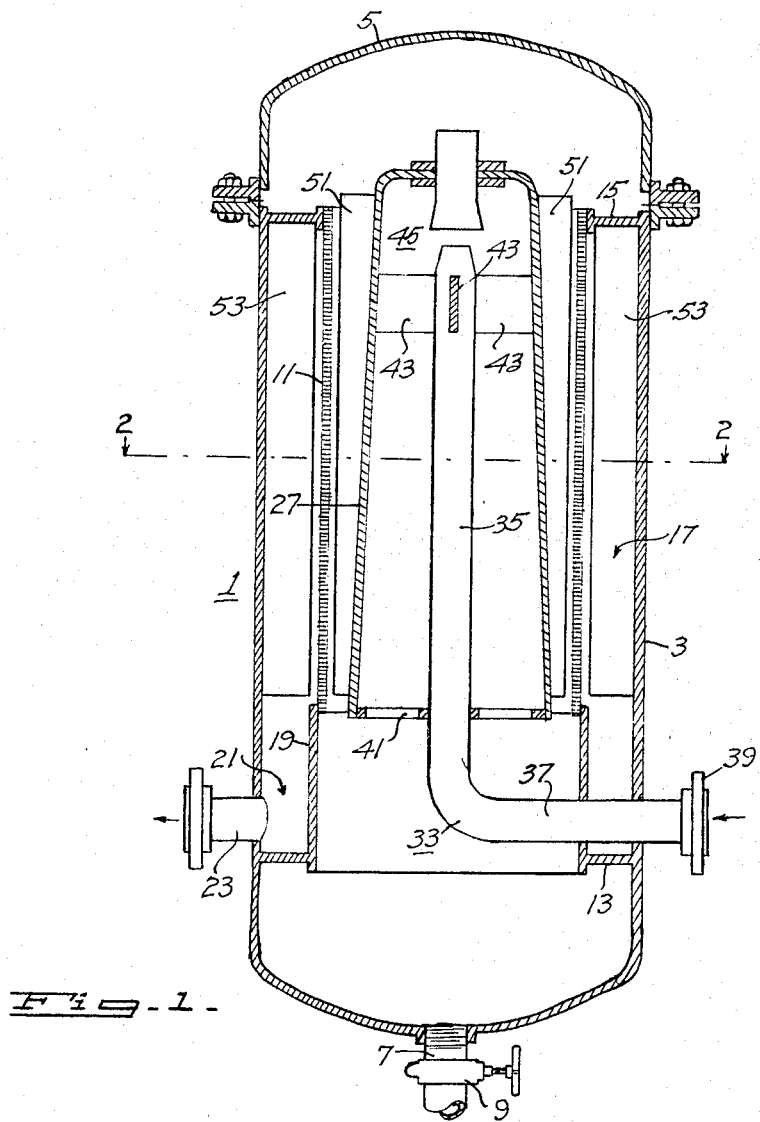

United States Patent Office 3,280,981
Patented Oct. 25, 1966

3,280,981
FILTER ASSEMBLY
Paul B. Renfrew, 3050 Roxbury Ave., Oakland, Calif.
Filed Feb. 10, 1964, Ser. No. 343,772
9 Claims. (Cl. 210—197)

My invention relates to filters and more particularly to a filter assembly for installation in liquid flow lines to filter foreign matter from the desired flow liquid of the system.

Present practive in connection with such filtering, is to permit filtering until the filter element becomes undesirably clogged with sediment, a condition which is determined either by a measured pre-determined increase in pressure drop across the filter, or by passage of a pre-determined period of operation based on past experience, or otherwise. Upon reaching this condition, the filter is serviced, either by backwashing, use of high pressure jets, built-in brushes, scrapers, and the like, or by dismantling the same to either clean or replace the filter element.

Frequently, filter elements may rupture during operation, due to the increase of pressure drop permitted to develop across the filter element, as sediment is trapped therein and fills the pores thereof, and when such rupture takes place, sediment is then free to pass downstream to defeat the very purpose of the filter.

Among the objects of my invention are:

(1) To provide a novel and improved filter assembly;

(2) To provide a novel and improved filter assembly which is self-cleaning;

(3) To provide a novel and improved filter assembly which cleans itself as it filters, whereby the pressure drop across the same will not appreciably vary during operation and can never reach the rupture point of the filter element during normal use;

(4) To provide a novel and improved filter assembly which will promote uniform distribution of liquid over the surface of the filter element, whereby to maintain uniform filtering conditions throughout the filter element, and (5) To provide a novel and improved filter assembly which can be safely employed in systems handling liquids requiring special precautions in the handling thereof.

Additional objects of my invention will be brought out in the following description of a preferred embodiment of the same, taken in conjunction with the accompanying drawings wherein:

FIGURE 1 is a view in section through a filter assembly of the present invention;

FIGURE 2 is a view in section taken in the plane 2—2 of FIGURE 1;

FIGURE 3 is a schematic view of a liquid flow system, depicting the location therein of the filter assembly of the present invention;

FIGURE 4 is a view in elevation of an embodiment of the present invention, specifically adapted for use in systems utilizing liquified gases such as propane, butane, and anhydrous ammonia, etc.

Referring to the drawings for details of my invention in its preferred form, the same may comprise a housing 1, substantially cylindrical in shape and comprising a main housing section 3 flanged at its upper edge to receive and have bolted thereto a cap 5 correspondingly flanged for the purpose.

At its lower end, the housing may be provided with a discharge fitting 7 including a valve 9, which is preferably hand manipulated, whereby discharge from the lower end of the housing may be controlled at the will of an operator.

Within the housing is a filter element 11 which is preferably of cylindrical form, and supported within the housing in axial alignment with the longitudinal axis of the housing, by spaced transverse partitions, a lower partition 13 and an upper partition 15, each extending inwardly from the wall of the housing and connecting to the filter element 11, adjacent an end of the filter, and together forming with one side of the filter element and the housing wall, a substantially annular chamber 17 about the filter element.

Preferably, the lower filter supporting partition 13 terminates in a high cylindrical flange 19, to the upper rim of which the filter element is connected, so as to form a cylindrical or annular trough 21 below the filter element, in which to receive and accumulate, the liquid filtering through the filter element.

A discharge fitting 23 emerging from the housing at the bottom of the trough, provides means for withdrawing the filtrate from the filter assembly.

Within the filter element and symmetrically disposed along the longitudinal axis thereof, in spaced relationship thereto, is a hollow baffle 27 of frusto-conical shape, opened to the admission of liquid at its lower end. This baffle in cooperation with the filter element, provides a tapered flow path for liquid gaining access to the upper end of the housing, and while such liquid may be made to gain access to the upper end of the housing by means of an intake connection through the cap 5, I prefer, for reasons to be subsequently considered, to provide access to the upper end of the housing by way of a liquid flow passageway axially of the frusto-conical baffle.

Such liquid flow passageway may be provided by an L-shaped section of piping 33, one part 35 of which extends axially of the baffle, while the other portion 37 extends through the wall of the housing where it terminates in a coupling flange 39. The axial position of the pipe portion 35 may be assured by a spider 41 at the lower entrance to the baffle 27 and radial arms 43 extending from the pipe portion toward the baffle adjacent the upper end of the baffle.

The pipe portion 35 may be continued right through the upper end of the frusto-conical baffle to discharge liquid into the upper end of the housing. Such liquid will then enter the wide end of the flow path between the baffle and the filter element, during which, a portion of the liquid will filter through the filter element and collect in the trough below, for discharge from the filter assembly.

In the course of such filtering, the remaining portion of the liquid will, during its flow over the filtered surface, exert a scrubbing action, to effect a dislodgment of sediment which would otherwise tend to clog the pores of the filter element and progressively impair the filtering efficiency to the point where the filter assembly would require servicing. In this connection, the vertical disposition of the components in the housing, causes gravity to assist in this scrubbing action.

The degree to which the scrubbing action may be relied on, will depend largely on the relative velocity of liquid over the surface of the filter, to the relative rate of flow of liquid through the filter, and this will vary with both the taper angle and the flow volume. While the ratio of the two flow rates is not critical, some ratios will provide better results than others, with one particular ratio giving most optimum results.

In practice, the velocity of the unfiltered component should be many times that of the filtered component, and to realize this in a normal operation, would in all likelihood require a greater volume of flow of liquid through the flow path over the filter element than would be provided by the normal input to the filter assembly.

To supplement the normal input volume, and without upsetting flow rates and flow conditions in other parts of the system in which the filter may be coupled, I provide for utilization of the unfiltered portion of the liquid, which is permitted to collect in the bottom of the housing where sedimentation can take place and a reservoir of sedimentated liquid will be available for the purpose.

To then utilize this liquid as a supplement to the liquid flowing into the filter assembly from the outside, I provide pump means preferably in the form of an eductor assembly 45 in the flow passageway of the external liquid, at some point in the axial portion 35 thereof, whereupon the flow of incoming liquid through the eductor will create a region of sub-operating pressure at this point and ultimately draw into the flow passageway, liquid which has accumulated in the lower portion of the housing.

In a filtering system, filter efficiency may be increased if the filtering action may be accomplished uniformly over the entire filter area, that is without the filter functioning to a greater degree at some points than at other points over its surface.

One step in this direction is to prevent turbulence on, preferably, both sides of the filter, which is accomplished through the use of vertical guide baffles 51 extending outwardly from the frusto-conical baffle toward the filter element, and similar baffles 53 on the inner wall of the housing and extending toward the filter element.

A second step in the direction of increasing filtering efficiency is to assure uniform velocity of liquid over the surface of the filter element, and toward this end, the tapered flow path over the filter element, created by the conical surface of the frusto-conical baffle, helps materially, for its tends to compensate for the progressive diversion of liquid from the main flow, through the filter element.

It will be apparent, for example, that, with a flow path of uniform cross section along the surface of the filter element, and as liquid filters through the filter element, progressively less will be the volume of liquid as it approaches the outlet end of the flow path, and consequently, the velocity of liquid flow over the filter surface will progressively decrease under these conditions.

Thus, the tapered flow path aids in remedying such a condition, and by making the slope of the baffle such that the resulting taper of the flow path will compensate entirely for the progressive reduction in the volume of flow, the velocity of flow will be substantially uniformly maintained. With the velocity of flow thus maintained substantially uniform along the surface of the filter element, the rate of filtering along the surface of the filter will be maintained substantially uniform.

A filter assembly of the type described above is adapted for use in many types of conventional liquid dispensing systems, one of which is schematically illustrated in FIGURE 3 of the drawings wherein liquid is dispensed from a storage supply tank 61 by a pump 63, which pumps the liquid through the filter assembly and a meter 65 to a receiver or point of utilization. With the filter assembly of the present invention installed in such system, cleaning of the filter element occurs simultaneously with the filtering action, while sediment thus cleaned from the filter element will accumulate in the lower portion of the housing, from which it may be discharged at will.

Should the sediment and liquid thus drained from the filter assembly housing contain valuable elements capable of being recovered, the drainage may be conducted to equipment capable of use for such recovery.

In storage terminals where petroleum products such as gasoline, fuel oil, etc., are stored for loading of trucks, transports, rail cars, barges or the like, there is usually a hazard involved in the draining of such material from a filter assembly. To minimize this hazard in connection with filter units employed in such systems, a sediment reservoir 69 (FIG. 4) is coupled to the discharge side of the drainage valve 9, the valve being left open during filtering operations, so that the sediment reservoir may receive the sediment separating out from the liquid in the lower portion of the housing. Upon such reservoir becoming filled with sediment, the valve may then be shut off, and the reservoir removed for dumping at some safe location.

A similar arrangement may be employed in plants processing and distributing liquified gases such as propane, butane, and anhydrous ammonia. Such an arrangement permits of the dumping of sediment with a minimum discharge of gas to the atmosphere, which would be limited to the small amount trapped in the reservoir with the sediment. Such gas can, if desired, be blown out to the atmosphere, or cleared through any suitable valve 71 installed in the wall of the reservoir.

From the foregoing description of my invention in its preferred form, it will be apparent that the same will fulfill all the objects attributed thereto, and while I have illustrated and described the same in considerable detail, the invention is subject to alteration and modification without departing from the underlying principles involved.

For example, basic advantages of the invention may be realized in any filter assembly where a flow path over the surface of a filter results in a substantial portion of flow functioning to scrub the filter element, and otherwise inhibiting clogging of the filter element while filtering is taking place, and whether or not, recirculation is provided for or deemed necessary.

The filter of the present invention has been described from the viewpoint of filtering liquid, but the principle involved is also applicable in the filtering of gases as well. Accordingly, the term liquid, as used in the claims, is to be construed as a word of description and not a word of limitation.

Further, I do not desire to be limited in my protection to the specific details of the invention as illustrated and described, except as may be necessitated by the appended claims.

I claim:

1. A filter assembly comprising
   a housing,
   a filter element,
   means supporting said filter element in said housing,
   means forming with said filter element, a flow path along one side of said filter element,
   means for continuously introducing a liquid and solids mixture to be filtered, into said housing for access to one end of said flow path for movement over the surface of said filter element, whereby a portion of said liquid will filter through said filter element while the remainder of said liquid and solids will emerge from the other end of said flow path,
   means for withdrawing from said housing, the portion of the liquid filtering through said filter element,
   means adjacent said other end of said flow path for continuously removing substantially all the solids from the remainder of said liquid, and means for recirculating the remainder of said liquid to the said one end of said flow path for mixing with liquid and solids mixture being introduced.

2. A filter assembly comprising
   a housing,
   a filter element,
   means supporting said filter element in said housing,
   means forming with said filter element, a tapered flow path along one side of said filter element,
   means for continuously introducing a liquid and solids mixture to be filtered, into said housing for access to the wide end of said flow path for movement over the surface of said filter element, whereby a portion of said liquid will filter through said filter element while the remainder of said liquid and solids will emerge from the narrow end of said flow path,
   means for withdrawing from said housing, the portion of the liquid filtering through said filter element,
   means adjacent the narrow end of said flow path for continuously removing substantially all of the solids from the remainder of said liquid, and means for recirculating the remainder of said liquid to the wide end of said flow path for mixing with liquid and solids mixture being introduced.

3. A filter assembly comprising
a housing,
a filter element,
means supporting said filter element in a vertical position in said housing,
means forming with said filter element, a flow path along one side of said filter element,
means for continuously introducing a liquid and solids mixture to be filtered, into said housing for access to one end of said flow path for movement over the surface of said filter element, whereby a portion of said liquid will filter through said filter element while the remainder of said liquid and solids will emerge from the other end of said flow path,
means for withdrawing from said housing, the portion of the liquid filtering through said filter element, means adjacent said other end of said flow path for continuously removing substantially all of the solids from the remainder of said liquid, and means for recirculating the remainder of said liquid to the said one end of said flow path for mixing with liquid and solids mixture being introduced.

4. A filter assembly comprising
a housing,
a filter element,
means supporting said filter element in a vertical position in said housing,
means forming with said filter element, a tapered flow path along one side of said filter element,
means for continuously introducing a liquid and solids mixture to be filtered, into said housing for access to the wide end of said flow path for movement over the surface of said filter element, whereby a portion of said liquid will filter through said filter element while the remainder of said liquid and solids will emerge from the narrow end of said flow path,
the rate of taper being such as to effect a substantially uniform velocity of liquid along said filter element from the wide end of said flow path to the narrow end,
means for withdrawing from said housing, the portion of the liquid filtering through said filter element, means adjacent the narrow end of said flow path for continuously removing substantially all of the solids from the remainder of said liquid, and means for recirculating the remainder of said liquids to the wide end of said flow path for mixing with liquid and solids mixture being introduced.

5. A filter assembly comprising
a housing,
a filter element,
means supporting said filter element in a vertical position in said housing,
means forming with said filter element, a tapered flow path along one side of said filter element,
means for continuously introducing a liquid and solids mixture to be filtered, into said housing for access to the wide end of said flow path for movement over the surface of said filter element, whereby a portion of said liquid will filter through said filter element while the remainder of said liquid and solids will emerge from the narrow end of said flow path,
the rate of taper being such as to effect a substantially uniform velocity of liquid along said filter from the wide end of said flow path to the narrow end,
means for withdrawing from said housing, the portion of the liquid filtering through said filter element,
means adjacent the narrow end of said flow path for continuously removing substantially all of the solids from the remainder of said liquid, and means for recirculating the remainder of said liquid to the wide end of said flow path for mixing with liquid and solids mixture being introduced,
said last means including an eductor in the flow path of liquid flowing into said housing.

6. A filter assembly comprising
a substantially cylindrical housing,
a substantially cylindrical hollow filter element,
means supporting said filter element in said housing,
said means including spaced transverse partitions extending inwardly from the cylindrical wall of said housing and connecting to said filter element, and forming with the outer side of said filter, a substantially annular chamber about said filter,
means forming with said filter element, a tapered flow path along the inner side of said filter, said last means including
a frusto-conical shaped baffle disposed within said filter element in spaced relationship thereto,
means for continuously introducing liquid and solids mixture to be filtered, into said housing for access to the wide end of said tapered flow path for movement over the surface of said filter element, whereby a portion of said liquid will filter through said filter element while the remaining portion of said liquid and solids will emerge from the narrow end of said flow path,
means for withdrawing from said housing, the portion of the liquid filtering through said filter element, means adjacent the narrow end of said flow path for continuously removing substantially all of the solids from the remainder of said liquid, and means for recirculating the remainder of said liquid to the wide end of said flow path for mixing with liquid and solids mixture being introduced.

7. A filter assembly comprising
a substantially cylindrical housing,
a substantially cylindrical hollow filter element,
means supporting said filter element in said housing with its longitudinal axis substantially in line with the longitudinal axis of said housing,
said means including spaced transverse partitions extending inwardly from the cylindrical wall of said housing and connecting to said filter element, and forming with the outer side of said filter element, a substantially annular chamber about said filter element,
means forming with said filter element, a tapered flow path along the inner side of said filter element, said last means including
a frusto-conical shaped baffle disposed within said filter element in spaced relationship thereto,
means for continuously introducing liquid and solids mixture to be filtered, into said housing for access to the wide end of said tapered flow path for movement over the surface of said filter element, whereby a portion of said liquid will filter through said filter element while the remaining portion of said liquid and solids will emerge from the narrow end of said flow path,
said liquid introducing means including a liquid flow passageway leading from a point externally of said housing, through the wall thereof to the region of said housing at the wide end of said tapered flow path,
means for withdrawing from said housing, liquid filtering through said filter element, means adjacent the narrow end of said flow path for continuously removing substantially all of the solids from the remainder of said liquid, and means for recirculating the remainder of said liquid to the wide end of said flow path for mixing with liquid and solids mixture being introduced.

8. A filter assembly comprising
a substantially cylindrical housing,
a substantially cylindrical hollow filter element,
means supporting said filter element in said housing with its longitudinal axis substantially in line with the longitudinal axis of said housing, said means including spaced transverse partitions extending inwardly from the cylindrical wall of said housing and connecting to said filter element, and forming with the outer side of said filter element, a substantially annular chamber about said filter element, means forming with said filter element, a tapered flow path along the inner side of said filter element, said last means including a hollow frusto-conical shaped baffle disposed within said filter element in spaced relationship thereto, means for continuously introducing liquid and solids mixture to be filtered, into said housing for access to the wide end of said tapered flow path for movement over the surface of said filter element, whereby a portion of said liquid will filter through said filter element while the remaining portion of said liquid and solids will emerge from the narrow end of said flow path, said liquid introducing means including a liquid flow passageway leading from a point externally of said housing, through the wall thereof and longitudinally of said hollow frusto-conical baffle, and emerging from the smaller end thereof, means for withdrawing from said housing, the portion of the liquid filtering through said filter element, means adjacent the narrow end of said flow path for continuously removing substantially all of the solids from the remainder of said liquid, and means for recirculating the remainder of said liquid to the wide end of said flow path for mixing with liquid and solids mixture being introduced, said last means including an eductor in said liquid flow passageway.

9. A filter assembly in accordance with claim 2, characterized by said means for continuously removing substantially all of the solids from the remainder of said liquid, as including a sediment reservoir, and means coupling said reservoir to said housing at a point in the flow path of the remainder of said liquid, to permit collection of sediment therefrom, said coupling means including a valve between said reservoir and said housing whereby to close off said coupling means prior to removal of said reservoir.

References Cited by the Examiner

UNITED STATES PATENTS

| | | | |
|---|---|---|---|
| 642,460 | 1/1900 | Kersten | 210—197 X |
| 1,784,132 | 12/1930 | Cabrera | 210—303 X |
| 1,860,836 | 5/1932 | Gustin | 210—455 |
| 2,502,349 | 3/1950 | Sebald | 210—197 X |
| 2,606,663 | 8/1952 | Blackman et al. | 210—303 |
| 3,056,499 | 10/1962 | Liddell | 210—456 X |
| 3,109,809 | 11/1963 | Verrando | 210—456 X |
| 3,154,485 | 10/1964 | Liddell | 210—247 X |
| 3,204,770 | 9/1965 | Brink | 210—456 X |
| 3,217,884 | 11/1965 | Long | 210—108 |

FOREIGN PATENTS 272,266   6/1927   Great Britain.

REUBEN FRIEDMAN, *Primary Examiner.*

J. DECESARE, *Assistant Examiner.*